Jan. 15, 1935.  A. M. PRENTISS  1,987,706
BRAKE TESTER
Filed Nov. 24, 1930   3 Sheets-Sheet 1

INVENTOR.
AUGUSTIN M. PRENTISS
BY
ATTORNEY

Jan. 15, 1935.  A. M. PRENTISS  1,987,706
BRAKE TESTER
Filed Nov. 24, 1930  3 Sheets-Sheet 2

INVENTOR.
AUGUSTIN M. PRENTISS
BY
M. W. McConkey
ATTORNEY

Jan. 15, 1935.  A. M. PRENTISS  1,987,706
BRAKE TESTER
Filed Nov. 24, 1930  3 Sheets-Sheet 3
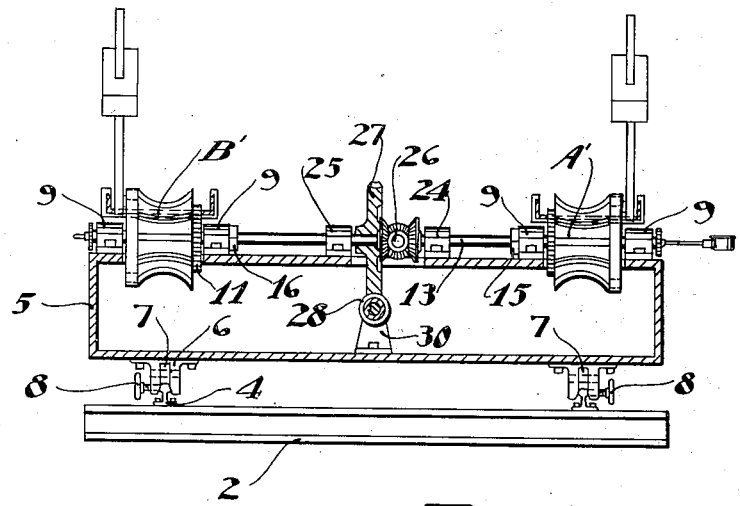
Fig. 3
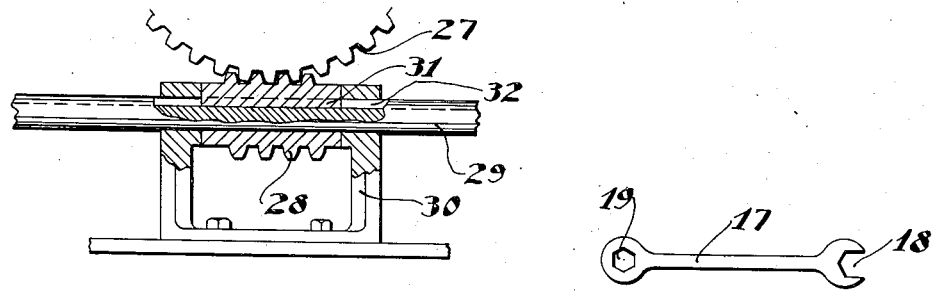
Fig. 4
Fig. 6
Fig. 7
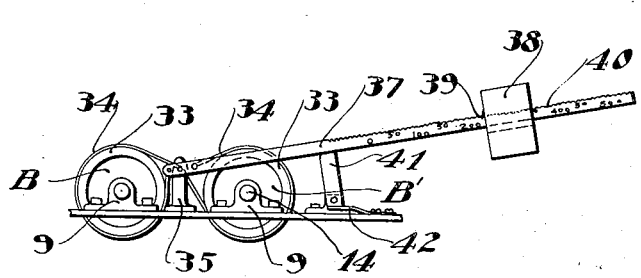
Fig. 5
INVENTOR.
AUGUSTIN M. PRENTISS
BY
ATTORNEY Patented Jan. 15, 1935

1,987,706

UNITED STATES PATENT OFFICE 1,987,706

BRAKE TESTER

Augustin M. Prentiss, San Antonio, Tex., assignor to Bendix-Cowdrey Brake Tester, Inc., South Bend, Ind., a corporation of Delaware Application November 24, 1930, Serial No. 497,671

2 Claims. (Cl. 73—51)

This invention relates to automobile brake testing devices and more particularly has reference to the dynamic type of brake tester wherein the resistance of the brakes is determined while the vehicle wheels are in motion just as they would be in the actual use of the brakes.

Heretofore, in brake testers of this type, three general methods of determining brake resistance have been employed. In the first method, the automobile wheels are rotated by a source of power within the testing machine, the brakes are then applied and the resistance to rotation of each wheel is measured by a torque resistance apparatus associated with each wheel turning means. In the second method, the automobile wheels are rotated by a source of power within the machine while supported upon rollers of considerable weight until a certain predetermined speed of rotation is attained; the heavy rollers with the supported automobile wheels are then disconnected from the driving power and the automobile brakes are applied; then, by means of revolution counters, an indication of the resistance of each brake is obtained by ascertaining the number of revolutions which each roller and its supported wheel make after the driving power is shut off and the brakes applied. By the third method, each automobile wheel is rotated at a uniform speed by a common source of power within the machine which exerts a constant torque upon the rollers driving the automobile wheels; the automobile brakes are then applied and, by means of speedometers attached to each wheel-rotating roller, the loss in rotational speed of the wheel under brake resistance is determined, from which the resistance of the brakes is ascertained.

The disadvantages common to all these prior art methods of testing brakes is that they involve machines of considerable complication and also require a source of power, such as electricity, which is consumed in testing the brakes. In many places, such as roadside garages, where electricity is not available, such machines cannot be used, and their cost usually limits their employment to large city garages which specialize in brake service.

The principal object of this invention is to provide a simple and cheap machine for testing brakes which requires no power other than that supplied by the automobile itself.

Another object of my invention is to provide a brake testing machine which is adapted for testing the brakes of automobiles of various wheel base lengths and which does not require manual adjustment for this purpose.

Still another object of my invention is to devise a brake testing machine which is capable of testing any or all of the brakes of an automobile either separately or together in any combination desired, so as to facilitate ready adjustment and quick equalization.

A still further object of my invention is to provide a brake testing machine in which the resistance of each brake may be directly compared with its theoretically correct resistance or the required resistance specified by the manufacturer.

With these and other objects in view which may be incident to my improvements, my invention consists in the combination and arrangement of elements hereinafter described and illustrated in the accompanying drawings, in which:—

Figure 3 is a transverse sectional view on the line 3—3 of Figure 1.

Figure 4 is an enlarged sectional view through one of the operating worm pinions and a portion of the drive shaft, together with the shaft bearing.

Figure 5 is an end elevation of one pair of driving rollers showing the adjustable braking device therefor.

Figure 6 is a side view of the roller locking link.

Figure 7 is a sectional view, on an enlarged scale, along the line 7—7 of Figure 1.

Figure 2:
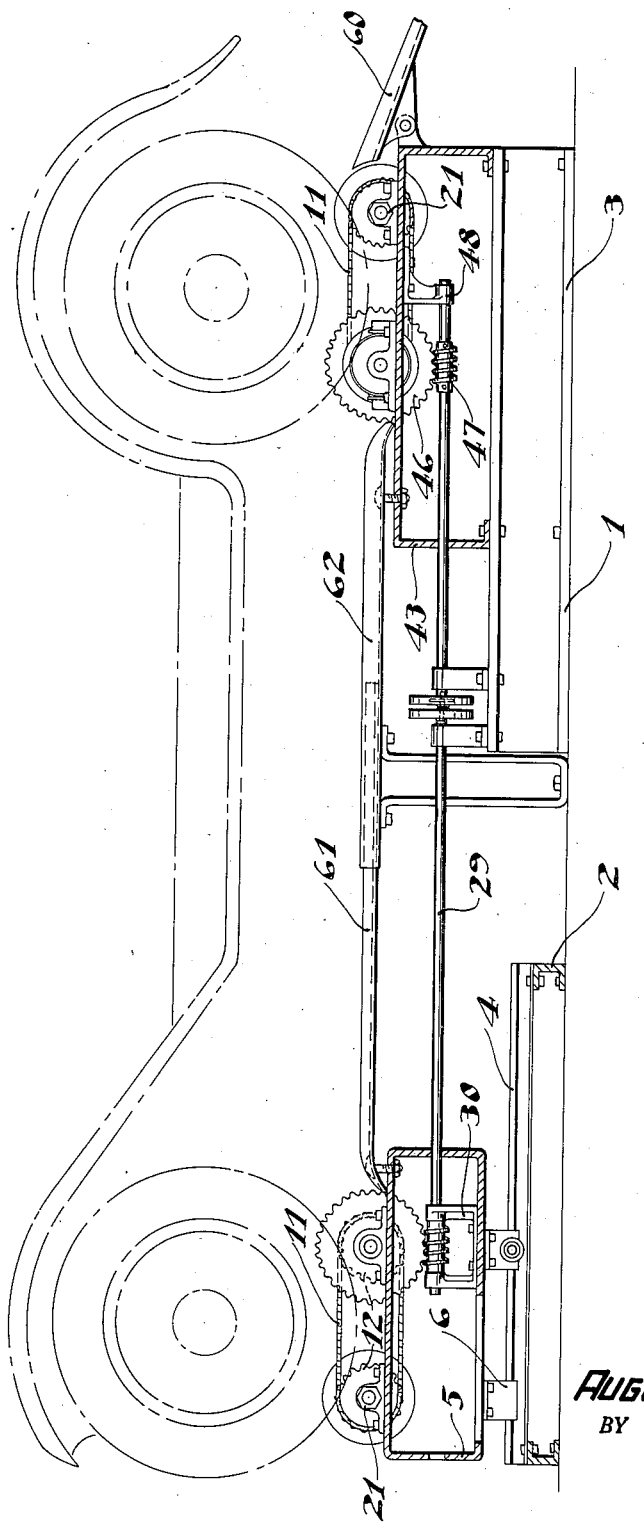
Figure 2 is a vertical, longitudinal sectional view thereof, on the line 2—2 of Figure 1.

In practice, my improved brake testing machine is supported on the ground or floor level, and approached by inclined ramps as shown in Figure 2. The distance that an automobile is raised above the floor level while supported by my brake testing machine is obviously a matter of choice in design and can be made anything desired to facilitate working under the automobile.

Referring to the accompanying drawings, the numeral 1 indicates the floor of a garage or a foundation on the ground, of suitable length, to which is secured channel irons 2 and 3 which form the basic framework of the forward and rear ends of the machine.

Upon each channel iron 2 is secured a rail or track 4 and upon these tracks is suitably mounted a carriage 5, preferably in the form of a hollow, rectangular structure, provided on its bottom side with shoes 6 slotted to fit upon tracks 4 and to overlie the sides thereof, so as to prevent lateral play of the carriage while permitting a transverse movement of the same upon the tracks as will be understood by reference to Figure 3.

Each shoe 6 has a roller 7 adapted to engage the top of rail 4, and one shoe on each rail also has a locking device 8 which permits the carriage to be locked in any desired position. This locking device may consist of a wedge, clamp, screw, or any other means of securing the carriage to the rails in any desired position. In the form here illustrated, it consists of a small hand-wheel mounted upon a screw shaft which is threaded through one side of shoe 6 and adapted to jam against rail 4 when tightened.

Upon the top of carriage 5 are mounted two pairs of rollers $a$, $a'$ and $b$, $b'$, one pair being directly above one of the tracks 4 and the other pair being directly above the other track. Each of these rollers is supported by bearings 9 which are bolted to the top of carriage 5, the rollers extending through openings 10 in the top of the carriage, as clearly shown in Figure 1. Each pair of rollers is connected together by a chain 11 which engages a sprocket 12 fixed to the shaft of each roller so as to rotate with it.

The rollers $a'$ and $b'$ are rigidly secured in axial alignment to the outer ends of shafts 13 and 14 respectively, which are mounted in the bearings 9. Upon the shafts 13 and 14 adjacent inner bearings 9, are rigidly secured hexagonal flanges 15 and 16 respectively, which are adapted to be locked against rotation by detachable links 17 provided with an open jaw 18 adapted to engage a flange 15 or 16 and with an hexagonal eye 19 adapted to engage a similar hexagonal flange 20 or 21 on the end of the shafts 22 and 23 supporting rollers $a$, $b$, respectively (see Fig. 3).

The inner ends of shafts 13 and 14 are supported by bearings 24 and 25 on carriage 5 and are driven through a differential 26 by a large gear 27 which meshes with and is driven by a worm 28. This worm is slidably but non-rotatably mounted on a drive shaft 29 which passes loosely through a hole in the end of carriage 5, and through the hub portions of a U-shaped bearing bracket 30 bolted to the bottom of carriage 5. The worm 28 is mounted on the shaft 29 between the hubs of the bracket 30 which hold the pinion in operative relation to the gear wheel 27 and the worm is provided with a spline 31 which fits in a groove 32 in shaft 29, as is clearly shown in Figure 4.

Figure 1:
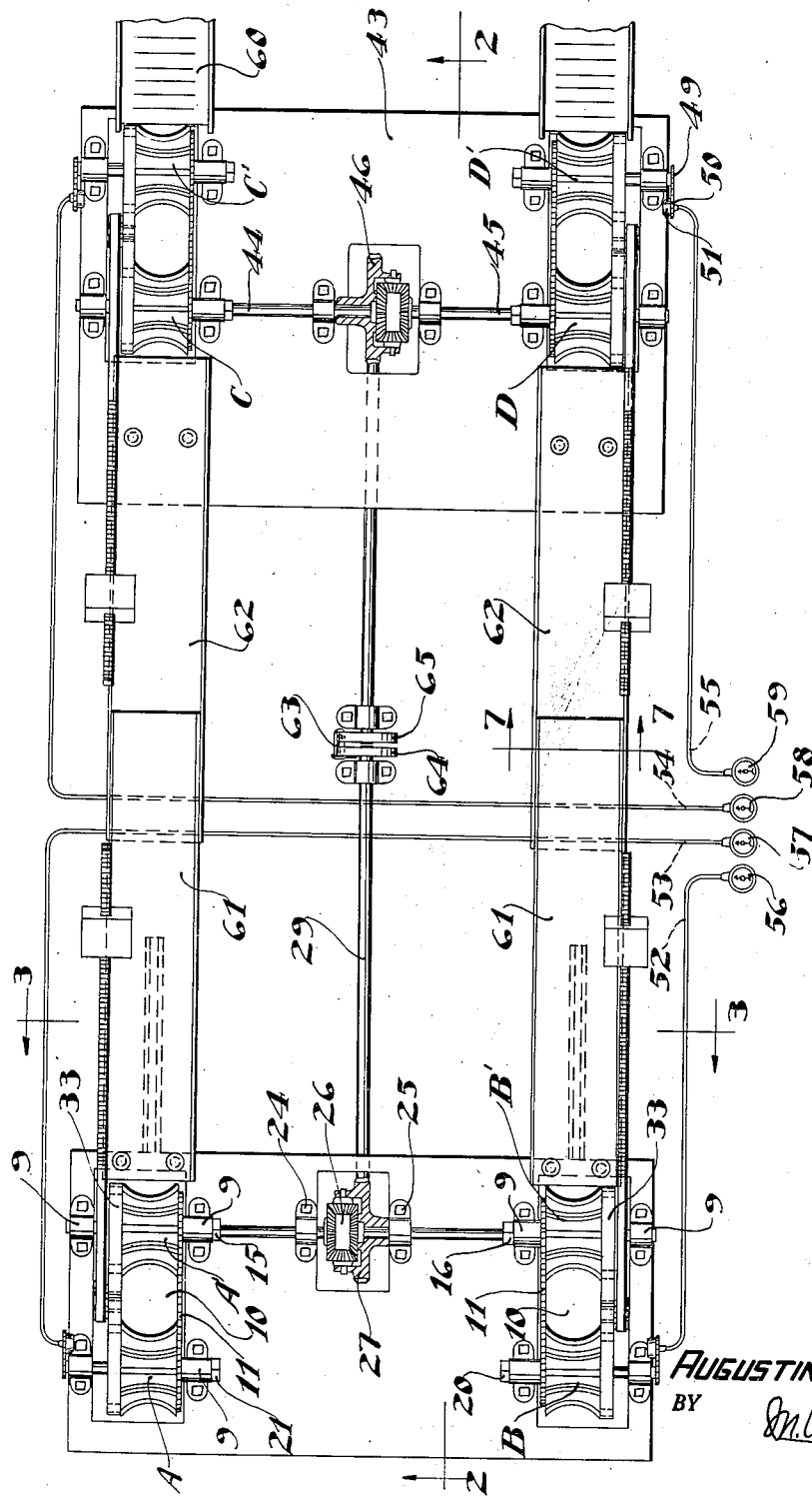
Figure 1 is a plan view of my improved brake testing device.

Each roller $a$, $a'$, $b$, $b'$, is grooved and corrugated as clearly shown in Figures 1 and 3 so as to provide maximum frictional contact between the surface of the roller and the tire of the supported wheel. Each roller also carries on its outer side an integral cylindrical flange 33 which serves as a brake drum for a brake band 34 anchored at one end to a suitable support or bracket 35 on carriage 5 and encircling flange 33. At its other end each brake band 34 is adjustably attached to a lever arm 37 also pivotally secured to bracket 35 so that as the free end of this arm is moved downwardly bands 34 contract and embrace flanges 33, as clearly shown in Figure 5.

Slidably mounted on arm 37 is a weight 38 provided with a lip 39 which engages in one of a series of notches 40 in the upper edge of arm 37. These notches are so located and spaced that the weight exerts a definite, measured pull on the free ends of bands 34 in the well known manner of a prony brake. Notches 40 are calibrated according to the force with which weight 38 causes bands 34 to exert on drums 33 so that these notches are an index of the braking force exerted on the rollers. Thus, each notch may represent 10 pounds braking pressure on each pair of rollers, $a$—$a'$, $b$—$b'$, and the notches 40 provided in each arm 37, representing from 10 pounds to 500 pounds braking pressure.

Every fifth notch is indicated by an index numeral etched on the side of arm 37, starting with 50 up to 500, as indicated in Figure 5. When the weight 38 is in the position of the first notch nearest the pivot of the arm, it exerts a braking pressure of 10 pounds on rollers, $a$—$a'$. Similarly when weight 38 is at the last notch near the free end of the arm it exerts a braking pressure of 500 pounds on the rollers.

Pivotally mounted upon carriage 5 immediately below arm 37 is an arm 41 which is adapted when in upright position, as shown in Figure 5, to support arm 37 so that no pressure is exerted on brake bands 34, and when in horizontal position clears arm 37 so that full effect of weight 38 is transmitted to bands 34. A leaf spring 42 riveted to carriage 5 and bearing against one end of arm 41 retains it in upright or horizontal position as set.

It is to be understood that each pair of wheel supporting rollers, such as $a$—$a'$, is provided with a similar brake mechanism, so that all the wheels of an automobile may be simultaneously placed under brake resistance while rotating upon the wheel supporting rollers. Also, it is obvious that other means of exerting a measured braking pressure upon the wheel supporting rollers may be employed within the scope of my invention, and that details of construction here disclosed are merely illustrative of the principles of the invention. The purpose and function of brakes 34 will be more fully explained in connection with the operation of my improved brake testing machine as hereinafter described.

Upon channel irons 3 at the opposite end of the machine, is rigidly mounted a fixed support 43, upon which are mounted pairs of grooved rollers $c$—$c'$ and $d$—$d'$ which are in line respectively with the rollers $a$—$a'$ and $b$—$b'$, and are in all respects similar thereto. In fact, the only difference between the roller assemblies $c$—$c'$, $d$—$d'$ and $a$—$a'$, $b$—$b'$ is that the latter are mounted upon a movable carriage, whereas the former are mounted upon a fixed support. Similarly, the rollers $c$ and $d$ which are in axial line, are rigidly mounted upon the outer ends of shafts 44 and 45 respectively, which are connected to shaft 29 in the same manner as shafts 13 and 14 through a differential gear 46 and a worm 47. The end of shaft 29 adjacent worm 47 is mounted in a bearing bracket 48 bolted to the under side of the support 43.

The outer ends of the shafts of the rollers $a$, $b$, $c'$, and $d'$ are provided with small gears 49 which mesh with similar gears 50 mounted on brackets 51 on carriage 5 and support 43, and the gears 50 are connected respectively by flexible shafts 52, 53, 54 and 55 with suitable speedometers 56, 57, 58 and 59 which serve to indicate the braking pressure applied to each of the pairs of wheel supporting rollers. Each speedometer is provided with a free hand which can be manually set to indicate any desired reading and to mark the previous reading of the machine.

The automobile is run up on the testing machine under its own power by means of inclined ramps 60 which are pivoted to support 43 as shown in Figure 2. In order that all four wheels of the car may rest upon the supporting rollers, as shown in dotted lines in Figure 1, it is necessary to bridge the space between the movable carriage 5 and the fixed support 43, so that a car can pass over the rollers first engaged and onto the rollers at the far end of the machine. This is accomplished by the use of a pair of telescoping channel irons 61 and 62 which rest at one end on the carriage 5 and at their other end on the support 43, as shown in Figures 1 and 2.

The operation of my improved brake testing machine is as follows: The car, the brakes of which are to be tested, is driven or backed on the machine so that each wheel will rest on a pair of rollers, as shown in dotted lines in Figure 2. With the locking devices 8 loose, carriage 5 is free to move on rails 4 and will normally be in a position nearest fixed support 43 to which it is drawn when the car previously on the testing machine is driven off. When the car is being driven onto the testing machine the first wheels engaged will pass over rollers c—c' and d—d', channels 61, 62 to a position on the rollers a' b' and a b. Since carriage 5 is free to move, it is automatically pushed forward by the engaged front wheels of the car until the rear wheels of the car engage the rollers c d and c' d'. The testing machine thus automatically adjusts itself to cars of different wheel bases.

If the car is backed onto the testing machine, toggles 41 adjacent rollers c' d' are placed in horizontal position and corresponding weights 38 are run out near the ends of arms 37 so as to bring considerable brake pressure to bear upon rollers c c' and d d' to prevent them from turning under the reaction from the driving wheels of the car, and the car can thus pull itself up on the testing machine. This is also necessary when the car is backed off the testing machine. When the last wheels of the car are engaged by rollers c c' and d d', clamps 8 are tightened and the machine is ready for testing.

In conducting a test, the first step is to set the weights 38 in the proper positions on levers 37 for the car under test. This setting is readily determined as follows: Each car is designed and constructed by its manufacturer to develop a certain total brake resistance with a specified pedal pressure when all the brakes are in normal working condition. Also the brakes of a car are designed to exert a definite maximum brake resistance when in normal operating condition and this total brake resistance is distributed among the four wheels in a certain ratio.

This data is readily obtained from the manufacturer for each type and model of car and should be made available to each testing station in chart or tubular form. When such data is not available, it may be readily computed for any particular car by taking 60% of the weight of the car as the maximum brake resistance, as this has been found to be the maximum practicable brake resistance attainable under average road and tire conditions. Then for distribution among the four wheels, each rear wheel may be given 30% of the total and each front wheel 20%, as this distribution has been found by experience to give the best all around results. After the proper resistance is determined as above, the corresponding setting is made with each weight 38. All four arms 41 are then placed in upright position to prevent brake bands 34 from exerting any pressure upon drums 33.

The engine of the car is then started and run continuously throughout the test. This is effected by manually setting the throttle from the steering wheel. The gears are then shifted into low and the clutch engaged. The throttle is set to cause the rear wheels of the car to rotate at a speed of from 15 to 25 miles per hour, and since the rollers supporting the rear wheels are connected through shaft 29 with the rollers supporting the front wheels, the front wheels will also be rotated at the same speed. The motor is run at or near full open throttle since it is only under these conditions that it delivers a substantially constant torque under a wide range of loads and speeds, and it is essential that the driving torque be substantially constant in order that the drop in velocity of wheel rotation under brake resistance be proportional to the brake pressure applied.

With the wheels of the car rotating as described, arms 41 are then lowered to their horizontal position and each pair of wheel supporting rollers is subjected to the brake resistance set as described above.

Under this constant brake resistance and the constant torque of the motor the wheels will rotate at a constant speed which is indicated for each wheel by the speedometers 56, 57, 58 and 59. If the testing machine is properly adjusted these readings should be the same when the settings of the weights 38 are the same. If not, proper adjustment of the brakes 34 are made until the readings coincide, but this adjustment will not be frequently required as it is only occasioned by unequal wear on the brakes 34.

The free hand on each speedometer is then brought into coincidence with the indicating hand to mark the reading obtained, and the brakes 34 are then released by placing arms 41 in an upright position. With the engine of the car still running with the same throttle setting, the brakes of the car are applied with the prescribed pedal pressure, as determined by a calibrated pedal depressor, and the corresponding speed of each wheel read from its speedometer.

If the brakes are in proper operating condition and delivering the brake resistance prescribed by the manufacturer, the second reading on the speedometers should substantially coincide with the first, as indicated by the free hands. Any departure from such coincidence indicates the amount and character of the abnormality of each brake. Thus, if the second reading on an indicator is less than the first, it shows that the corresponding brake is not delivering the full prescribed brake resistance. This may, of course, be due to improper adjustment, to grease, or to wear. If the former is the case, it is easily corrected by tightening the brake adjusting screws, or the brake hook-up connections; if the latter is the case, the brake must be cleaned or relined. On the other hand, if the second reading is greater than the first, it indicates that the brake is adjusted too tight and should be loosened. When the hand shows an unsteady reading during test, it indicates that the brake drum is out of round or scored.

It is to be particularly noted that all four brakes of the car can be tested simultaneously and this is the normal procedure in testing the brakes as it greatly facilitates equalization and adjustment and reduces the time required to properly adjust a car. If, for any reason, however, it is desired to test one or more brakes individually, the wheels and rollers not involved can be eliminated by locking their supporting rollers against rotation with the locking links described above and illustrated in Figure 6. When testing cars having two wheel brakes only, the front wheels are disconnected by opening the latch 63 which normally couples the co-operating discs 64 and 65 fixed on the rear and front sections of drive shaft 29.

With other factors constant, the change in velocity of a rotating body is proportional to the applied resistance to rotation, so that the drop in speed of the wheel supporting rollers when either brakes 34 or the automobile brakes are applied, is a measure of the resistance of these brakes, both absolutely and relatively. From this it follows that the resistance of the automobile brakes could be computed from a single reading of the drop in speed of the wheel supporting rollers when the automobile brakes are applied from that obtaining when these brakes are not applied. However, in order to save time and labor, it is more convenient to have a direct basis for comparison and since all brakes are designed to develop a certain brake resistance under normal conditions, I have provided my testing machine with a set of adjustable brakes which can be set at any desired value within a wide range to develop the brake resistance specified for any particular car.

My testing machine is thus a brake comparator, in which the resistance of the automobile brakes are directly compared with a calibrated standard set of brakes under dynamic conditions similar to those actually obtaining in use. I have also found that some form of retardation is necessary during the rotation of the automobile wheels before the automobile brakes are applied, as otherwise, the engine will race with the throttle set at or near wide open position. And it is essential that the engine be run at or near full throttle as it is only under these conditions that the engine develops a substantially constant torque under wide variations of load and speed. Therefore, brakes 34 serve a dual role, that of a calibrated standard set of brakes for the purpose of comparison, and as a means of retardation of the engine to prevent its racing during the test.

It will be further noted that by connecting with sprockets and chains the rollers in each pair, each roller becomes a working member to transmit brake resistance to the supported wheel. Thus, by doubling the area in contact with the wheel and corrugating the roller surfaces, all danger of slipping of the wheels upon their supporting rollers is obviated.

From the foregoing, it will be apparent that I have devised a simple and effective machine for testing the brakes of automobiles in which the motor of the car itself furnishes the power to rotate the wheels and test the brakes. Thus, my brake tester can be used in places where outside power is not available. Also, since no external power is required to run my tester, it is cheaper to build and operate than the power driven machines of the prior art.

While I have shown and described the preferred form of my invention, I desire it to be understood that I do not limit myself to the constructional details disclosed by way of illustration, as these may be readily changed and modified by those skilled in the art without departing from the spirit of my invention or exceeding the scope of the appended claims.

Having thus described the various features of the invention, what I claim as new and desire to secure by Letters Patent is:—

1. A brake testing machine for a motor vehicle having driving wheels and non-driving wheels, and brakes on all wheels, comprising means adapted for rotation by the driving wheels of the vehicle by power from the vehicle motor, means for rotating the non-driving wheels of the vehicle, said second named means including a driving connection with the first named means, and a variable brake having torque and speed measuring means applicable to each means associated with the driving and non-driven wheels said brake being adapted to load the vehicle motor during temporary release of the brakes during a test, whereby the motor may be prevented from racing.

2. A brake testing machine for automotive vehicles having four wheel brakes, comprising front wheel tread rollers, rear wheel tread rollers, a differential connected between the front wheel tread rollers, a differential connected between the rear wheel tread rollers, means for driving the front wheel rollers through the front wheel differential, said means including a driven connection with the rear differential, a prony brake for the rollers of each wheel, and a speed indicator for the rollers of each wheel whereby the machine may be operated by power from the vehicle motor, said prony brake being adapted to prevent racing of the vehicle motor during temporary release of the vehicle brakes so that the motor may be operated with a fixed throttle setting.

AUGUSTIN M. PRENTISS.